UNITED STATES PATENT OFFICE.

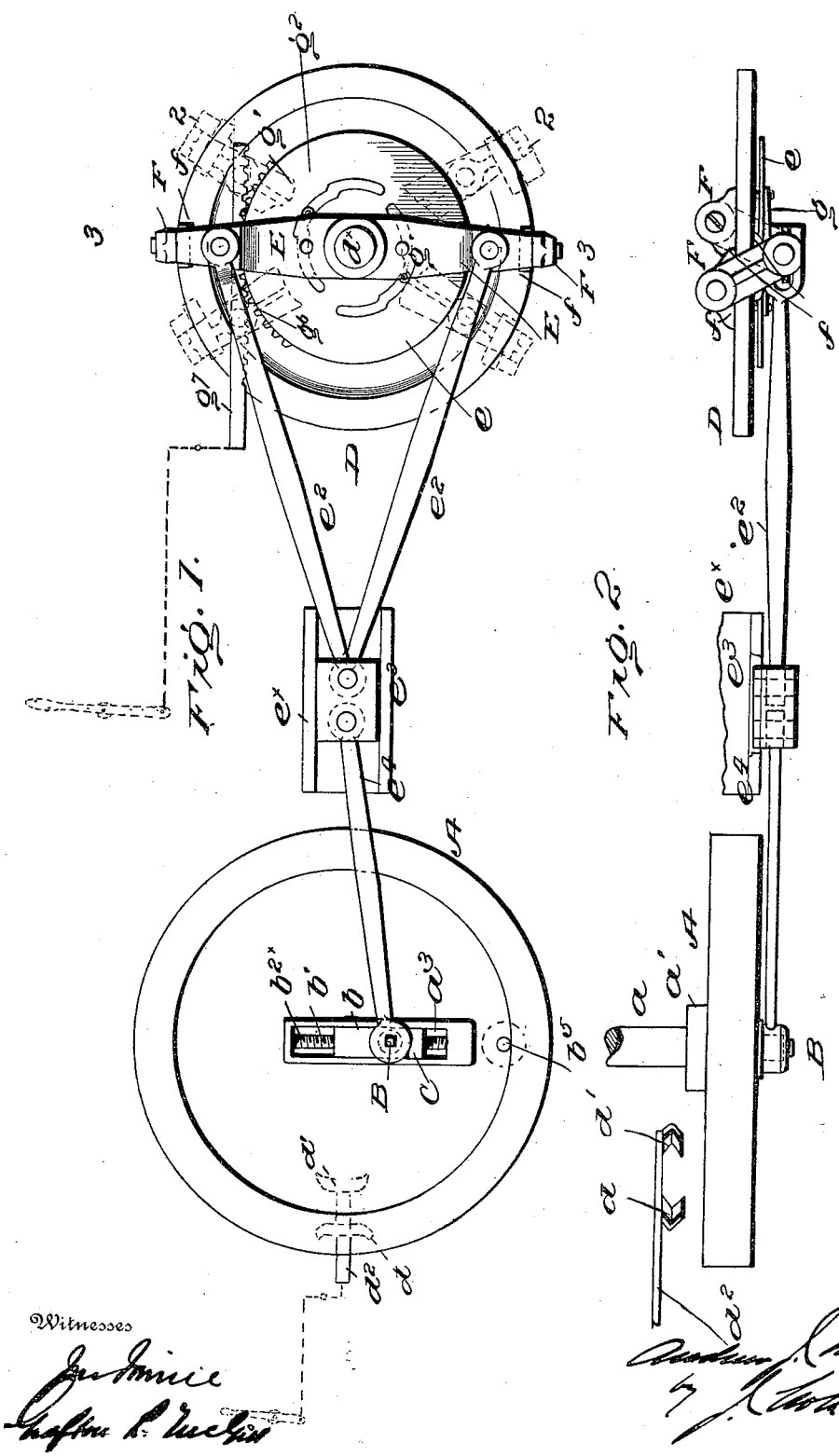

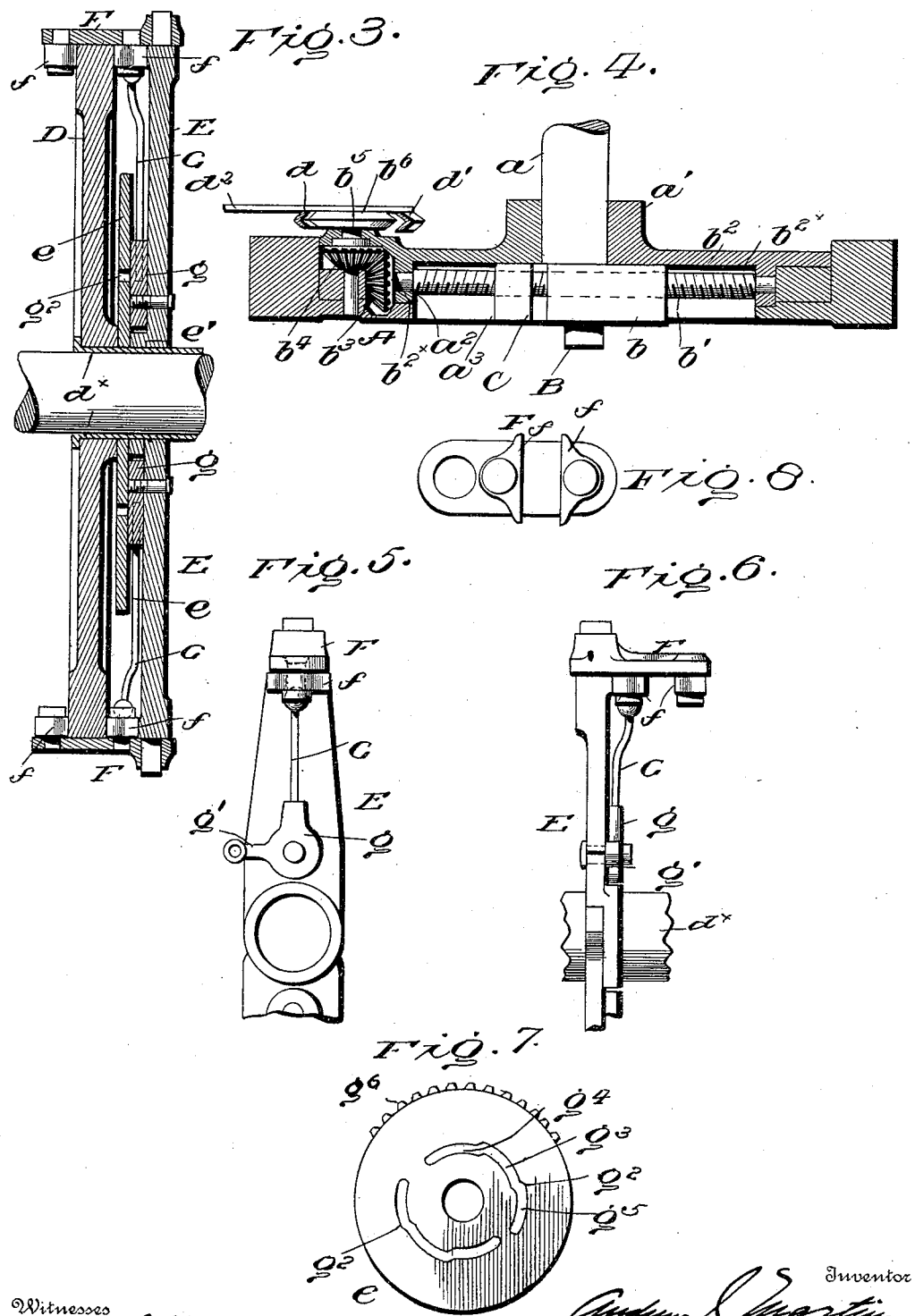

ANDREW J. MARTIN, OF BUFFALO, NEW YORK.

MOTOR-VEHICLE.

SPECIFICATION forming part of Letters Patent No. 641,313, dated January 16, 1900.

Application filed January 13, 1899. Serial No. 702,077. (No model.)

*To all whom it may concern:*

Be it known that I, ANDREW J. MARTIN, of Buffalo, in the county of Erie and State of New York, have invented certain new and useful Improvements in Motor-Vehicles; and I do hereby declare the following to be a full, clear, and exact description of the invention, such as will enable others skilled in the art to which it appertains to make and use the same.

This invention contemplates certain new and useful improvements in motor-vehicles, having special reference to changeable-speed gearing.

The objects of the invention are, first, to provide for readily and easily effecting a change in the speed of the vehicle without interfering with the operating mechanism—that is, the driving power will always remain the same, although the speed may be varied, and, secondly, to avoid any jarring or unevenness of operation consequent upon increasing the speed of the vehicle.

The first object I accomplish by providing the fly-wheel of a crank-shaft with a shiftable crank-pin which has its bearing in said wheel and is capable of being moved away from and toward the axial center of said wheel. This crank-pin is mounted on a threaded shaft which is located diametrically within the fly-wheel. By rotating this shaft the crank-pin will be moved either toward the periphery of the wheel or toward the axial center of the latter. This rotation of the shaft may be effected in any desired way while the wheel is in motion.

The second object of the invention is accomplished by providing a counterweight, which is also movable back and forth on the shaft. This shaft has right and left hand screw-threads extending from the center of the wheel to the ends of the shaft. As the crank-pin is caused to travel in one direction by the rotation of the shaft the counterweight moves in the opposite direction relative to the axial center of the wheel.

The invention will be hereinafter fully set forth, and particularly pointed out in the claims.

In the accompanying drawings, Figure 1 is a side elevation showing a clutch and fly-wheel constructed in accordance with my invention. Fig. 2 is a plan view thereof. Fig. 3 is a vertical sectional view on line 3 3, Fig. 1. Fig. 4 is a transverse sectional view of the fly-wheel. Figs. 5 and 6 are enlarged views of one of the clutch-arms and adjuncts. Fig. 7 is a view of the cam-plate detached. Fig. 8 is a bottom plan view of one of the clutch-shoe plates.

Although my improvements are primarily designed to be employed in connection with a motor-vehicle, it is not essential to a clear understanding thereof that such vehicle be illustrated or described.

Referring to the drawings, A designates a fly-wheel, and $a$ a crank-shaft upon which said wheel is axially mounted, said shaft fitting in a hub or boss $a'$ on one side of the wheel at the center thereof. Within this wheel is a diametrical bore $a^2$, which extends to near the periphery and opens through one side of the wheel, forming a slot $a^3$.

B is a crank-pin, and $b$ the base-block thereof, fitted so as to slide in slot $a^3$. This block has a threaded bore to accommodate the thread $b'$ of a shaft $b^2$, extended longitudinally within bore $a^2$. This shaft is held in place by apertured lugs $b^{2x}$ of one side of the wheel. The shaft $b^2$ may be rotated according as it is desired to increase or lessen the speed of the vehicle by any suitable means, it being only necessary to turn such shaft sufficiently to locate the crank-pin at the desired point relative to the axial center of the wheel. The means shown embraces a beveled pinion $b^3$, which meshes with a second beveled pinion $b^4$, whose shaft $b^5$ is mounted in wheel A at right angles to shaft $b^2$. The outer end of this shaft projects beyond the inner side of wheel A and has keyed thereon a wheel $b^6$. By turning this wheel and its shaft the rotation of the shaft $b^2$ is effected. In this way the crank-pin and its block will be caused to travel back and forth in the slot $a^3$, thereby positioning the same nearer to or farther away from the center of the fly-wheel, according as it is desired to lessen the speed at the gain of power or increase the speed at the cost of power.

The shaft $b^2$ is formed with right and left hand threads, the crank-pin block being in engagement with the former, while on the latter thread is a counterbalancing-weight C. This weight is also movable within the bore $a^2$ on the other side of the center of the wheel from the crank-pin. The latter and the weight always travel synchronously toward or away from the wheel-center, the weight serving to counterbalance the positioning of the crank-pin and avoiding the jarring consequent upon the pin being moved away from the axial center of the wheel.

The wheel $b^6$ is shown as having a V-shaped periphery. Two upright curved bars $d\ d'$, carried by a horizontally-movable slide $d^2$, are provided with V-grooves to accommodate the periphery of the wheel $b^6$. The bars $d\ d'$ are so spaced apart that the wheel $b^6$ may travel between them without contact; but when the slide is moved one bar or the other will be in line to be engaged by the wheel $b^6$. Thus the latter will be turned, the direction being governed according as the contact is with the bar $d$ or $d'$. In this way the shifting of the crank-pin and counterweight is effected. The slide $d^2$ may be moved by any suitable means.

D is the clutch-wheel, which in practice is keyed on a rotary bearing or sleeve $d^\times$, on which is keyed one of the carrying-wheels. (Not shown.) The rear carrying-wheels are preferably those to which the clutch-wheels are thus secured through the intermediary of the sleeve.

E E are two clutch-arms, and $e$ is a cam-disk loose on sleeve $d^\times$. The arms E are extended, one upward and the other downward. At their inner ends they are loosely mounted on sleeve $d^\times$ and are both connected by two toggles $e^2$ to a cross-head $e^3$, which is guided by a plate $e^\times$. To the cross-head $e^3$ is secured one end of a pitman $e^4$, loose at its other end on crank-pin B. To the outer end of each arm E is pivotally secured one end of a plate F. Both of these plates extend transversely over the periphery of wheel D, and each carries two centrally-pivoted shoes $f$, which face the opposite flat faces of wheel D, with which when the plates F are thrown off a straight line—that is, set obliquely to the periphery of the wheel—they engage so as to firmly bite the sides of the wheel. The inner faces of these shoes are consequently made to conform to the engaging faces on the sides of the wheel. The shoes have a prying-like action against the sides of the wheel, and when the carrying-arm is moved in the direction in which the plate is set the shoes will bite like a vise against the wheel and cause the latter to rotate with the arms. Yet on the recovery stroke of each arm the wheel will not be interfered with by the shoes. The two carrying-arms act alternately to effect the rotation of the clutch-wheel—that is, as one arm is on its recovery stroke the wheel is being rotated by the other arm, the shoes of the former allowing the wheel to pass between them without frictional contact. The direction of rotation of wheel D is controlled by the position in which the shoe-carrying plates F are set obliquely—that is, when the upper plate is thrown with its extremity rearward and the lower plate with its extremity forward the wheel D will be rotated in the forward direction, while it will be moved rearward when the positions of the upper and lower plates are reversed. The two arms E E are operated synchronously, while their clutch-shoes act on the wheel D successively—that is, while the clutch-shoes of one arm are gripping the wheel the shoes of the other arm are slipping. For instance, to obtain a forward movement of the wheel D, and consequently the vehicle, both of the arms E will be forced as far to the rear as possible, (see position indicated by dotted lines 2, Fig. 1,) and the plate F of the upper arm is caused to lie obliquely across the face of the wheel with its extreme end pointing forward, while the plate F of the lower arm is positioned with its extreme end pointing forward. The crank-pin being started to the rear, both of the arms E must follow, and the wheel D also, since the shoes of the plate F of the upper arm have the grip and the plate F of the lower arm is slipping. When the half-revolution of the fly-wheel is completed and the arms E start on their rearward movement, the shoes of the plate of the lower arm will grip wheel D while those of the upper arm are slipping. In this way the wheel D is being continuously revolved, the clutch-shoes of one arm acting to pull the wheel and those of the other to push it; but when these plates are set on a straight line extended directly across the periphery of the wheel, the shoes will not engage the latter in the reciprocal movements of their carrying-arms.

G G designate two spring-rods having outer rounded ends fitted in sockets in the inner shoes—that is, those adjoining the pivoted ends of the plates F. Each of these spring-rods projects from a lever $g$, mounted on the inner end of each arm E and having a lateral extension $g'$, which fits in a slot $g^2$ of cam-disk $e$. There are two such slots in this cam-disk, and each slot is composed of three sections, a central section $g^3$ and two end sections $g^4\ g^5$. These three sections are concentric with the axis of the disk, but are all on different radii—that is, the radius of the section $g^4$ is less than that of the central section $g^3$, while the radius of the other end section $g^5$ is greater than that of the other sections. The end sections open angularly into the central section. It is by adjusting this disk that the shoe-carrying plates are shifted—that is, when the disk is so set that the extensions $g'$ of the two levers $g$ will travel in the central sections $g^3$ of the upper and lower slots the plates F will extend straight across the periphery of the wheel D; but when the disk is turned so as to throw, say, the end sections $g^4$ into line with the extensions $g'$ the plates F will be set so as to rotate the wheel D forward. The arc of each section of each slot controls the radius of movement of the lateral projection $g'$ of each lever $g$. The positions of the shoe-carrying plates will not be altered or disturbed save when the disk is itself turned axially. Hence by shifting the disk $e$ the direction of travel of the vehicle may be reversed or the wheels, as on a downgrade, may be allowed to rotate without aid or hindrance from the clutch-arms.

The means for shifting the cam-disk may be of any preferred form or kind. I have shown segmental rack-teeth $g^6$ in the periphery, with which a rack-bar $g^7$ may engage for this purpose.

In practice the operator can at pleasure regulate the speed of the vehicle. By any suitable connection the slide $d^2$ may be shifted so as to throw either one of the contact-bars $d\ d'$ in line to be engaged by the wheel $b^6$. As this occurs the screw-shaft is rotated each time the wheel $b^6$ engages such bar $d$ or $d'$. When the desired speed is obtained, the slide is moved so that the wheel $b^6$ will pass between the bars $d\ d'$ without contacting with either. The cam-disk $e$ is positioned so that one end section of each slot will brought into line with the lateral projections of the levers $g$. This will, through the rods G G, effect the setting of the two plates F obliquely across the periphery of the clutch-wheel. The revolution of the fly-wheel will cause the reciprocation of the arms E. Each of these is moved in the direction in which the shoe-carrying plates are set, the shoes will firmly grip against the flat sides of the clutch-wheel and cause the rotation of the latter. As the clutch-shoes of one arm are thus acting on the clutch-wheel those of the complementary arm which is on the recovery stroke are sliding, the wheel passing between them without impediment. By thus causing the clutch-shoes to bind against the engaging surfaces on opposite sides of the clutch-wheel the danger of slipping is avoided and a firm grip is secured at each operation.

I do not confine myself to any details of construction. Although I have specified my improvements as being specially designed for use in connection with motor-vehicles, such as are commonly called "horseless carriages," yet the same may be used on traction-engines and, in fact, in any desired manner or for any purpose.

It will be noted that the bite of the shoes of each clutch-arm being when the arm is moved in the direction in which the clutch-wheel is being rotated such wheel can under certain conditions move at an accelerated speed—that is, faster than the movement of the clutch-arm. For instance, in turning the vehicle the carrying-wheel describing the outer circle will, together with the clutch-wheel fixedly connected therewith, travel faster than the clutch-arms. The clutch-wheel will then be free to slide or pass between the clutch-shoes, the latter not in any way interfering with this increased or accelerated speed of the clutch-wheel.

I do not herein make claim to the clutching mechanism, the same forming the subject-matter of a divisional application, Serial No. 718,554.

I claim as my invention—

1. In a motor-vehicle, a fly-wheel having a shiftable crank-pin and a counterbalancing-weight, and means for effecting the adjustment thereof while the wheel is in motion.

2. In a motor-vehicle, a fly-wheel having a shiftable crank-pin, a revoluble bearing therefor, a counterbalancing-weight also on said bearing, and means for revolving said bearing while the wheel is in motion.

3. In a motor-vehicle, a fly-wheel having a shiftable crank-pin, a threaded shaft therefor, a weight also on said shaft, and means for turning said shaft, substantially as set forth.

4. In a motor-vehicle, a fly-wheel having a shiftable crank-pin, a revoluble bearing therefor, a wheel, for effecting the turning of such bearing, having its engaging periphery movable outside of the planes of the fly-wheel, and a slide for contacting with opposite points of the periphery of such wheel, as set forth.

5. In a motor-vehicle, a fly-wheel having a shiftable crank-pin, a shaft in said wheel having a thread on which said crank-pin is movable, a second shaft at right angles to said former shaft, gearing between such shafts, a wheel, on said second shaft, having its engaging periphery outside of the planes of the fly-wheel, and a frictional device designed to engage opposite points of the periphery of such latter wheel, substantially as set forth.

6. In a motor-vehicle, a fly-wheel having a shiftable crank-pin, a shaft in said wheel having a thread on which said crank-pin is movable, a second shaft at right angles to said former shaft, gearing between said shafts, a wheel on said second shaft, and a slide having frictional sides with which said latter wheel is designed to engage, substantially as set forth.

7. In a motor-vehicle, a fly-wheel having a shiftable crank-pin, a revoluble bearing therefor, a counterbalancing-weight also on such bearing, a wheel, for effecting the turning of such bearing, having engaging portions outside of the fly-wheel, and a slide for contacting with such engaging portions, as set forth.

8. In a motor-vehicle, a fly-wheel having a shiftable crank-pin, a shaft in said wheel having a thread on which said crank-pin is movable, a counterbalancing-weight also on said shaft, a second shaft at right angles to said former shaft, gearing between said shafts, a wheel on said second shaft, and means designed to effect the turning of said latter wheel comprising a device capable of engaging therewith, substantially as set forth.

In testimony whereof I have signed this specification in the presence of two subscribing witnesses.

ANDREW J. MARTIN.

Witnesses:
 JAMES J. MURPHY,
 ROBERT GALLOWAY.